(12) United States Patent
Brown

(10) Patent No.: US 11,554,653 B2
(45) Date of Patent: Jan. 17, 2023

(54) VEHICLE COVER BLOW-OFF PREVENTION SYSTEM, DEVICE AND METHOD

(71) Applicant: Ronald W. Brown, Cincinnati, OH (US)

(72) Inventor: Ronald W. Brown, Cincinnati, OH (US)

(\*) Notice: Subject to any disclaimer, the term of this patent is extended or adjusted under 35 U.S.C. 154(b) by 94 days.

(21) Appl. No.: 17/230,961

(22) Filed: Apr. 14, 2021

(65) Prior Publication Data

US 2022/0332178 A1  Oct. 20, 2022

(51) Int. Cl.
*B60J 11/04* (2006.01)
*B60R 11/00* (2006.01)

(52) U.S. Cl.
CPC .............. *B60J 11/04* (2013.01); *B60R 11/00* (2013.01); *B60R 2011/004* (2013.01); *B60R 2011/0059* (2013.01)

(58) Field of Classification Search
CPC ........ B60R 13/0206; B60R 2013/0287; B60R 13/02; B29C 45/14065; B29C 45/14336; B29C 2045/14442; B29C 45/1418; B60Q 3/54; B62D 29/041; B29K 2101/12; B29K 2701/12; B29L 2031/302; B29L 2031/3008; B29L 2031/3014; B29L 2031/3041
USPC ...................................................... 296/136.1
See application file for complete search history.

(56) References Cited

U.S. PATENT DOCUMENTS

| 2,798,501 A | * | 7/1957 | Oliver | B60J 11/00 |
| | | | | 135/88.06 |
| 2,989,967 A | * | 6/1961 | Lee | E04H 15/06 |
| | | | | 135/88.13 |
| 4,605,030 A | * | 8/1986 | Johnson | E04H 6/04 |
| | | | | 135/117 |
| 4,655,236 A | * | 4/1987 | Dorame | E04H 6/04 |
| | | | | 135/88.06 |
| 4,944,321 A | * | 7/1990 | Moyet-Ortiz | E04H 15/48 |
| | | | | 135/148 |
| 5,241,977 A | * | 9/1993 | Flores | E04H 15/58 |
| | | | | 135/88.06 |

(Continued)

FOREIGN PATENT DOCUMENTS

CN   107962941 A   4/2018
DE   3814044 A1   10/1988

(Continued)

OTHER PUBLICATIONS

Brown, Ronald, Written Opinion of the International Searching Authority, International Patent Application No. PCT/IB2017/055253, dated Dec. 14, 2017.

*Primary Examiner* — Pinel E Romain
(74) *Attorney, Agent, or Firm* — David Guerra

(57) ABSTRACT

A vehicle cover blow-off prevention system for holding down a vehicle cover to prevent it from blowing off during windy conditions. The system includes tire mats configured to support a tire of the vehicle thereon. The tire mats include a mat body, a tire stop, and a mat connector member. Cover straps can be used to secure the vehicle cover to the vehicle. The cover strap includes a first and second cover connector member. The first cover connector member is configured to engage with the mat connector member of a first of the tire mats, and the second cover connector member is configured to engage with the mat connector member of a second of the tire mats. The weight of the vehicle holds the mats in place, which accordingly holds the cover on the vehicle.

15 Claims, 3 Drawing Sheets

(56) References Cited

U.S. PATENT DOCUMENTS

| | | | | |
|---|---|---|---|---|
| 5,857,477 | A * | 1/1999 | James | B60J 11/00 |
| | | | | 135/88.06 |
| 7,946,306 | B2 * | 5/2011 | Ampoyo | E04H 6/025 |
| | | | | 135/88.06 |
| 8,607,810 | B1 * | 12/2013 | Chung | E04H 6/04 |
| | | | | 135/88.13 |
| 9,010,348 | B1 * | 4/2015 | Kite | E04H 6/04 |
| | | | | 135/88.06 |
| 9,163,394 | B1 * | 10/2015 | Barker | E04B 1/40 |
| 9,926,715 | B1 * | 3/2018 | Morrison | E04H 15/06 |
| 10,895,092 | B2 * | 1/2021 | Rapp | E04H 6/04 |
| 2009/0183809 | A1 * | 7/2009 | Wiegel | B60J 11/00 |
| | | | | 150/166 |
| 2015/0357105 | A1 | 12/2015 | Taylor et al. | |
| 2019/0160930 | A1 | 5/2019 | Brown | |
| 2019/0389294 | A1 | 12/2019 | Brown | |

FOREIGN PATENT DOCUMENTS

| | | | | |
|---|---|---|---|---|
| DE | 202012010911 U1 | | 3/2013 | |
| GB | 2598822 A | * | 3/2022 | ............. B60J 11/04 |
| KR | 20140027737 A | | 7/2014 | |
| WO | WO-2004028844 A1 | * | 4/2004 | ............. B60J 11/00 |
| WO | 2018042374 A1 | | 3/2018 | |

* cited by examiner

VEHICLE COVER BLOW-OFF PREVENTION SYSTEM, DEVICE AND METHOD

BACKGROUND

Technical Field

The present technology relates to a vehicle cover blow-off prevention system, device and method for use in connection with preventing a cover from blowing off a vehicle. In particular, the present technology prevents heavy wind forces from causing the uncovering of a seated vehicle, automobile, aircraft or boat cover utilizing the weight of the vehicle.

Background Description

The use of car cover hold-down devices may be known, however these hold-down devices do not allow for the adjustability of a hold-down force and/or portability. Conventional automobile covers may include tie downs to assist in holding the cover on the car. However, these tie downs are difficult to use and do not allow for any adjustability in their holding operations.

It is a common problem that wind can blow off a vehicle cover or partially off, thereby exposing the exterior of the vehicle to the elements. Securing the vehicle cover to the vehicle has been a problem and the subject of several solutions.

While the above-described devices fulfill their respective, particular objectives and requirements, the aforementioned devices or systems do not describe a vehicle cover blow-off prevention system, device and method that allows securing a vehicle cover utilizing the weight of the vehicle.

A need exists for a new and novel vehicle cover blow-off prevention system, device and method that can be used for securing a vehicle cover utilizing the weight of the vehicle. In this regard, the present technology substantially fulfills this need. In this respect, the vehicle cover blow-off prevention system, device and method according to the present technology substantially departs from the conventional concepts and designs of the prior art, and in doing so provides an apparatus primarily developed for the purpose of securing a vehicle cover utilizing the weight of the vehicle.

SUMMARY

In view of the foregoing disadvantages inherent in the known types of car cover holding devices, the present technology provides a novel vehicle cover blow-off prevention system, device and method, and overcomes one or more of the mentioned disadvantages and drawbacks of the prior art. As such, the general purpose of the present technology, which will be described subsequently in greater detail, is to provide a new and novel vehicle cover blow-off prevention system, device and method and method which has all the advantages of the prior art mentioned heretofore and many novel features that result in a vehicle cover blow-off prevention system, device and method which is not anticipated, rendered obvious, suggested, or even implied by the prior art, either alone or in any combination thereof.

According to one aspect, the present technology can include a vehicle cover blow-off prevention system including tire mats that can be configured to support a tire of a vehicle thereon. Each of the tire mats can include a mat body, a tire stop at one end of the mat body, and a mat connector member configured to hold a vehicle cover to the vehicle.

According to another aspect, the present technology can include a vehicle cover blow-off prevention system including tire mats and a cover strap. The tire mats can be configured to support a tire of a vehicle thereon. Each of the tire mats can include a mat body, a tire stop at one end of the mat body, and a mat connector member configured to hold a vehicle cover to the vehicle. The cover strap can be configured to secure a vehicle cover to the vehicle. The cover strap can include a first cover connector member at a first end of the cover strap, and a second cover connector member at a second end of the cover strap. The first cover connector member can be configured to engage with the mat connector member of a first of the tire mats, and the second cover connector member can be configured to engage with the mat connector member of a second of the tire mats.

Some or all embodiments of the present technology can include cover straps configured to secure a vehicle cover to the vehicle. The cover straps can include a first cover connector member at a first end of the cover strap, and a second cover connector member at a second end of the cover strap. The first cover connector member can be configured to engage with the mat connector member of a first of the tire mats, and the second cover connector member can be configured to engage with the mat connector member of a second of the tire mats.

In some or all embodiments of the present technology, the tire stop can include an elongated member extending across the end of the mat body in a direction lateral with the tire placed on the tire mats, respectively.

In some or all embodiments of the present technology, the mat body can enclose the elongated member.

In some or all embodiments of the present technology, the mat connector member can include a mat connector strap attached to the mat body, and a mat connector piece.

In some or all embodiments of the present technology, the first cover connector member can include a first cover connector strap attached to the first end of the cover strap, and a first cover connector piece can be engageable with the mat connector piece of the first of the tire mats. The second cover connector member can include a second cover connector strap attached to the second end of the cover strap, and a second cover connector piece can be engageable with the mat connector piece of the second of the tire mats.

In some or all embodiments of the present technology, the mat connector member is a pair of mat connector members, the first cover connector member is a pair of first cover connector members, and the second cover connector member is a pair of second cover connector members.

In some or all embodiments of the present technology, the cover strap can include an arched section configured to receive a side section of the tire.

In some or all embodiments of the present technology, the mat connector member can be a clamp pivotably attached to the mat connector strap.

Some or all embodiment of the present technology can include one or more cover connector members each including a cover connector strap and a cover connector piece. The cover connector strap can be fixed to the vehicle cover at a location near the tire of the vehicle when the vehicle cover is placed over the vehicle so that the cover connector piece is capable of engaging with the mat connector piece, respectively.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is another object of the present technology to provide a new and novel vehicle cover blow-off prevention system, device and method that may be easily and efficiently manufactured and marketed.

An even further object of the present technology is to provide a new and novel vehicle cover blow-off prevention system, device and method that has a low cost of manufacture with regard to both materials and labor, and which accordingly is then susceptible of low prices of sale to the consuming public, thereby making such vehicle cover blow-off prevention system, device and method economically available to the buying public.

Still another object of the present technology is to provide a new vehicle cover blow-off prevention system, device and method that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE EMBODIMENTS

Figure 1:
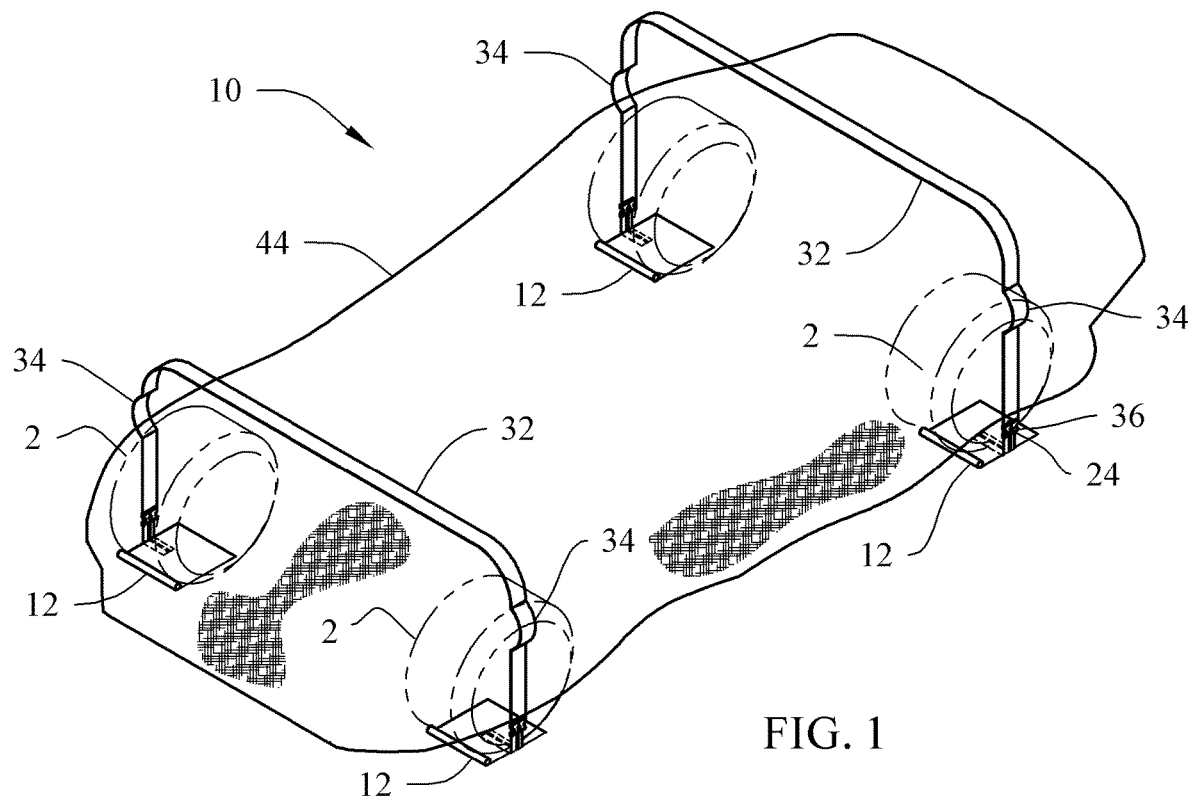
FIG. 1 is a perspective view of an embodiment of the vehicle cover blow-off prevention system, device and method constructed in accordance with the principles of the present technology, with the phantom lines depicting environmental structure and forming no part of the claimed present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-6, an embodiment of the vehicle cover blow-off prevention system, device and method of the present technology is shown and generally designated by the reference numeral 10.

In FIG. 1, a new and novel vehicle cover blow-off prevention system, device and method 10 of the present technology for securing a vehicle cover utilizing the weight of the vehicle is illustrated and will be described. More particularly, the vehicle cover blow-off prevention system, device and method 10 includes tire mats 12, cover straps 32 connectable to the tire mats 12, and a vehicle cover 44 configured to cover a vehicle.

In the exemplary, the present technology will be described for utilization with an automobile, but it can be appreciated that the present technology can be used with other vehicles such as, but not limited to, motorcycles, quads, three-wheeled vehicles, campers, trailers, boats and the like.

Figure 2:
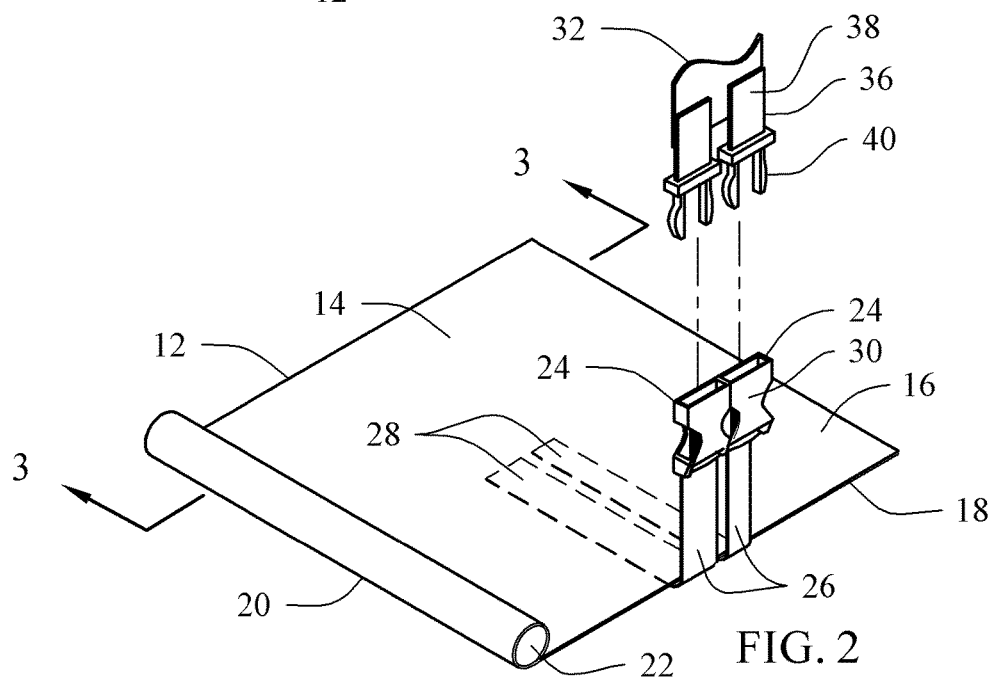
FIG. 2 is an exploded perspective view of the vehicle cover blow-off prevention device utilized with a left side of the vehicle, with a right side vehicle cover blow-off prevention device being a mirror image thereof.

The tire mats 12 can include pair of right side mats configured to be utilizable with the right (passenger) side tires of the vehicle and a pair of left side mats configured to be utilizable with the left (driver) side tires of the vehicle. Referring to FIG. 2, a driver side mat 12 is illustrated and described, where it can be appreciated that the passenger side mat 12 includes the same structural elements but mirrored to that of the driver side mat.

The tire mats 12 each include a mat body 14 featuring a top side 16 and a bottom side 18, a tire stop 20, and a mat connector member 24. The mat body 14 can have any geometric configuration capable of being placed on the ground or floor, while allowing a tire 2 of the vehicle to placed thereon. The top side 16 can be smooth or textured to grip or provide friction with the tire 2, thereby preventing the tire mat 12 from sliding. The bottom side 18 can be smooth or textured to grip or provide friction with the ground or floor, thereby preventing the tire mat 12 from sliding. The mat body 14 can be made from any durable material that can withstand environmental elements, and wear and tear from the vehicle driving and/or placed thereon. In the exemplary, such materials can be, but not limited to, rubber, vinyl, plastic, metal and the like.

The tire stop 20 can be located at one end of the mat body 14, and can include an elongated member 22 laterally extending across the tire mat 12. The elongated member 22 can have, but not limited to, a cross-sectional profile that is cylindrical, square, triangular or polygonal, as best illustrated in FIG. 3.

Figure 3:
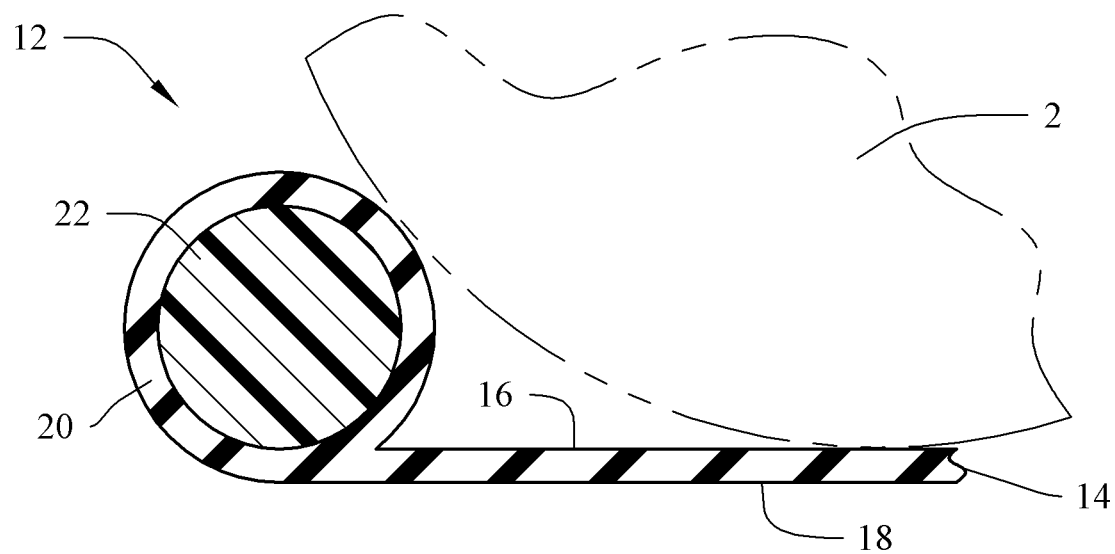
FIG. 3 is a cross-section view of the vehicle cover blow-off prevention device of the present technology taken along line 3-3 in FIG. 2.

The mat body 14 can extend or enclose the elongated member 22 to create the tire stop 20, or the elongated member 22 can be attached to the mat body 14 to create the tire stop 20, as best illustrated in FIG. 3. The tire stop 20 extends up from the mat body 14 a height sufficient to contact the tire 2, and can even be configured to resist the tire from rolling thereover.

The mat connector member 24 can be a pair of connector members adjacent to each other in a side by side configuration. It can be appreciated that the present technology can utilizing a single mat connector member 24 or multiple mat connector members placing in spaced apart relationship from the mat body 14.

The mat connect member 23 can include a mat connector strap 26 with a section 28 secured to the mat body 14 and a free section extending outwardly therefrom. The section 28 can be secured to either the top side 16 or the bottom side 18 of the mat body 14 by any suitable means such as, but not limited to, stitching, adhesives, mechanical fasteners, hook and loop fasteners, snaps and the like.

The free section of the mat connector strap 26 can be securing to a mat connector piece 30 such as, but not limited to, a female connector or male connector. Further, the free section of the mat connector strap 26 can be adjustable in length.

In the exemplary, when the vehicle cover 44 is made for automobiles, with the two cover straps 32 being of a thin nylon or other sturdy material that can be sewn on top or below the vehicle cover 44. Alternatively, the cover straps 32 can be separate from the vehicle cover 44 and utilized to secure an existing vehicle cover 44 to the vehicle. The cover straps 32 can be a pair of straps each running laterally across the vehicle cover 44 to each side of the vehicle cover 44 (door to door). At each termination of the four ends of the cover straps 32 is a cover connector member 36 including a cover connector strap 38. The cover connector member 36 can be a pair of connector members adjacent to each other in a side by side configuration. It can be appreciated that the present technology can utilizing a single cover connector member 36 or multiple cover connector members placing in spaced apart relationship from the cover strap 32.

The cover connector member 36 can include a cover connector strap 38 with a section secured to the cover strap 32 and a free section extending outwardly therefrom. The section can be secured to either an outside (exterior) surface of the cover strap 32 or an inside (interior) surface of the cover strap 32 by any suitable means such as, but not limited to, stitching, adhesives, mechanical fasteners, hook and loop fasteners, snaps and the like.

The free section of the cover connector strap 38 can be securing to a cover connector piece 40 such as, but not limited to, a female connector or male connector that removably mates with the mat connector piece 30. Further, the free section of the cover connector strap 38 can be adjustable in length.

The cover strap 32 can include a bowed, arched or enlarged section 34 configured to receive an enlarged or widened section of the tire 2 or rim of the tire, as best illustrated in FIG. 1. Further, the cover strap 32 and/or the cover connector strap 38 can include an elastic section configured to allow the cover strap 32 to stretch in length.

Figure 4:
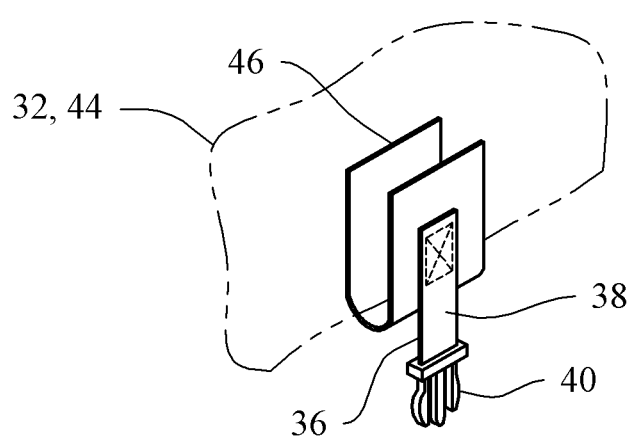
FIG. 4 is a perspective view of an embodiment of the cover connector of the vehicle cover blow-off prevention system of the present technology.

Referring to FIG. 4, the cover connector member 36 can be attached to a first side of a connector strip 46, which is configured to attach to the vehicle 44 or the cover strap 32. The connector strip 46 can include a second side opposite the first side to create a space therebetween configured to receive an end or edge of the vehicle cover 44 or an end of the cover strap 32, thereby sandwiching the vehicle cover 44 or the cover strap 32 there between. The connector strip 46 can be secured to the vehicle cover 44 by any suitable means such as, but not limited to, stitching, adhesives, mechanical fasteners, hook and loop fasteners, snaps and the like.

Figure 5:
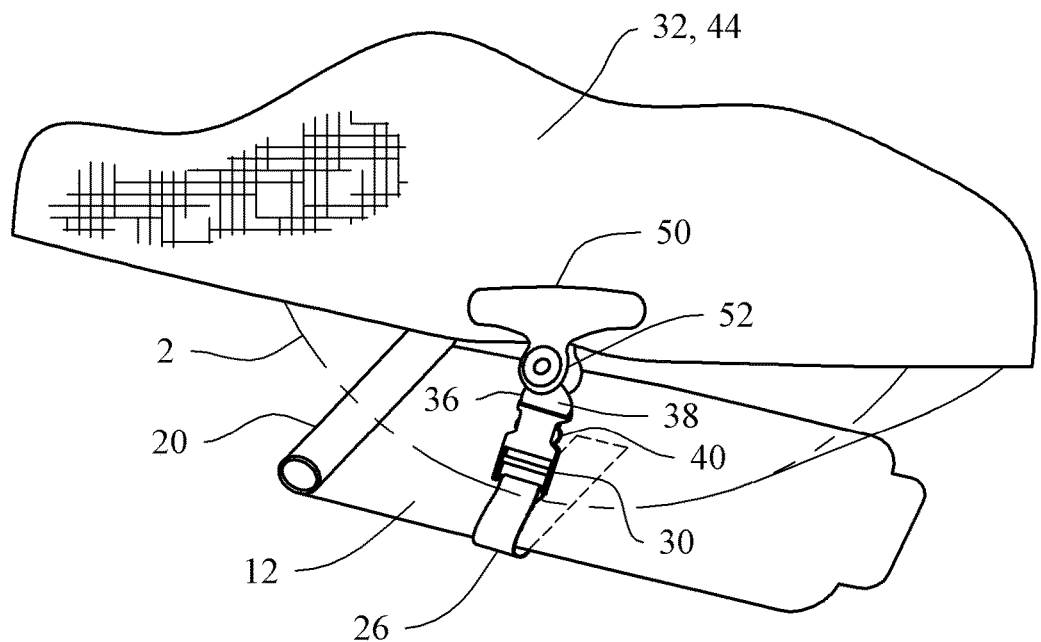
FIG. 5 is a perspective view of the clamp cover connector of the vehicle cover blow-off prevention system.

In the alternative, as best illustrated in FIG. 5, the cover connector member 36 can include a clamp 50 configured to attached to the cover strap 32 or the vehicle cover 44. The cover connector strap 38 can be pivotably coupled 52 to one of the handle members of the clamp 50, thereby allowing the clamp 50 to swivel in relation to the cover connector member 36.

One advantage of having the cover straps 32 not fixedly secured to the vehicle cover 44 is that once a vehicle cover has been manufactured with sewn in four or more belts with fasteners and/or connectors in position of the tires 2, it is not feasible to duplicate exactly the advantage of the built in feature of the original previously described device. However, the concept of using two strong nylon straps 32 and quick coupling members 40 separate from an existing vehicle cover 44, to hold the vehicle cover 44 in place without being fixed by sewing it to the vehicle cover 44 is still relevant and useful. This allows the present technology to be utilized with greater flexibility and adjustability with different sizes and shapes of vehicles.

Figure 6:
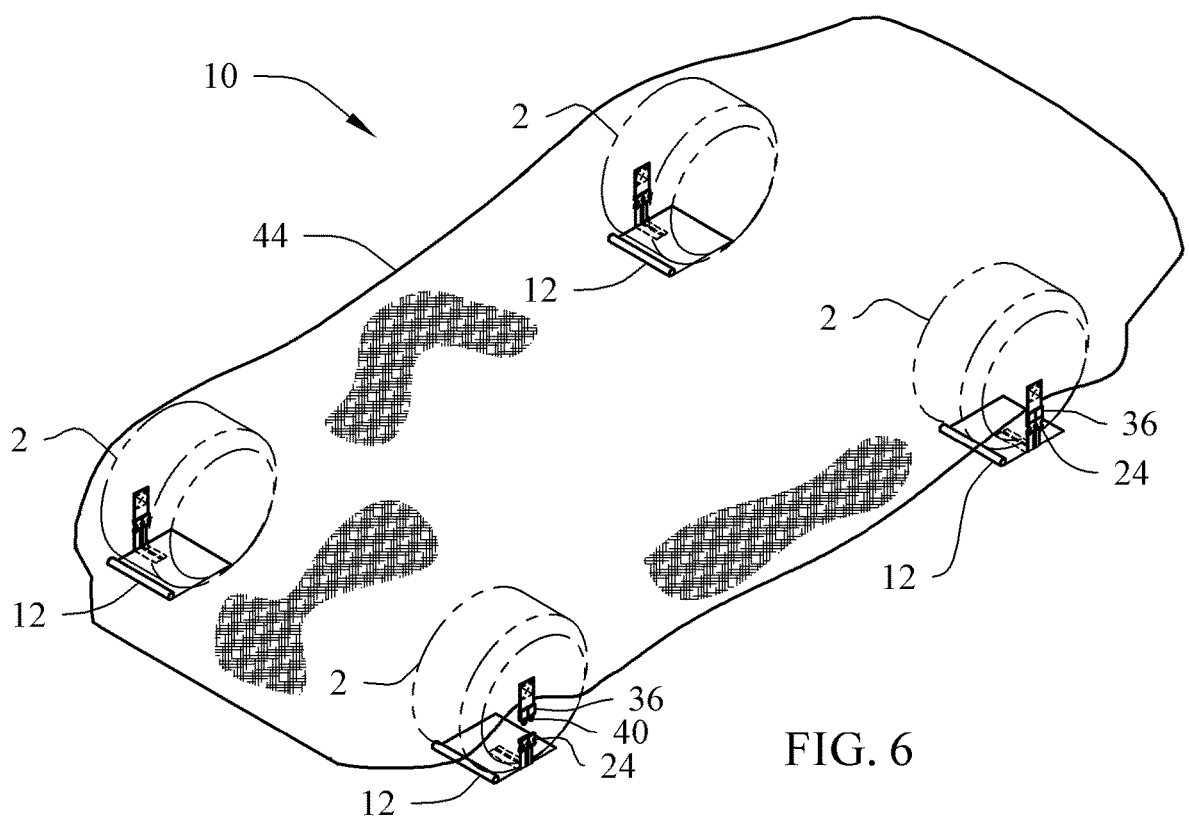
FIG. 6 is a perspective view of an embodiment of the vehicle cover blow-off prevention system, device and method constructed in accordance with the principles of the present technology with one of the cover connector members disengaged from its male connector member.

In FIG. 6, an embodiment of the vehicle cover blow-off prevention system 10 of the present technology can include the cover connector members 36 integrally attached to a bottom edge area of the vehicle cover 44 for securing the vehicle cover 44 to the tire mats 12. In this embodiment, each of the cover connectors 36 can include a cover connector strap 38 attached to the bottom edge area of the vehicle 44, by any suitable means such as, but not limited to, sewing or stitching a portion of the cover connector strap 38 to the vehicle cover 44. It can be appreciated that this embodiment includes four cover connector members 36, each attached to the vehicle cover 44 at areas at or near each of the tires 2 of the vehicle being covered.

Associated with teach cover connect strap 38 can be a cover connector piece 40 that is engageable with the mat connector piece 30 of the tire mats 12.

According to one aspect, the present technology can include a vehicle cover blow-off prevention system 10 including tire mats 12 that can be configured to support a tire 2 of a vehicle thereon. Each of the tire mats 12 can include a mat body 14, a tire stop 20 at one end of the mat body 14, and a mat connector member 24 configured to hold a vehicle cover 44 to the vehicle.

According to another aspect, the present technology can include a vehicle cover blow-off prevention system 10 including tire mats 12 and a cover strap 32. The tire mats 12 can be configured to support a tire 2 of a vehicle thereon. Each of the tire mats 12 can include a mat body 14, a tire stop 20 at one end of the mat body 14, and a mat connector member 24 member configured to hold a vehicle cover 44 to the vehicle. The cover strap 32 can be configured to secure a vehicle cover 44 to the vehicle. The cover strap 32 can include a first cover connector member 36 at a first end of the cover strap 32, and a second cover connector member 36 at a second end of the cover strap 32. The first cover connector member 36 can be configured to engage with the mat connector member 24 of a first of the tire mats 12, and the second cover connector member 36 can be configured to engage with the mat connector member 24 of a second of the tire mats 12.

In some or all embodiments of the present technology, the tire stop 20 can include an elongated member 22 extending across the end of the mat body 14 in a direction lateral with the tire 2 placed on the tire mats 12, respectively.

In some or all embodiments of the present technology, the mat body 14 can enclose the elongated member 22.

In some or all embodiments of the present technology, the mat connector member 24 can include a mat connector strap 26 attached to the mat body 14, and a mat connector piece 30.

In some or all embodiments of the present technology, the first cover connector member 36 can include a first cover connector strap 38 attached to the first end of the cover strap 32, and a first cover connector piece 40 can be engageable with the mat connector piece 30 of the first of the tire mats 12. The second cover connector member 36 can include a second cover connector strap 38 attached to the second end of the cover strap 32, and a second cover connector piece 40 can be engageable with the mat connector piece 30 of the second of the tire mats 12.

In some or all embodiments of the present technology, the mat connector member 24 is a pair of mat connector members, the first cover connector member 36 is a pair of first cover connector members, and the second cover connector member 36 is a pair of second cover connector members.

In some or all embodiments of the present technology, the cover strap 32 can include an arched section 34 configured to receive a side section of the tire 2.

In some or all embodiments of the present technology, the mat connector member 24 can be a clamp 50 pivotably attached to the mat connector strap 26.

In use, it can now be understood that a user could place a driver side mat 12 in front of or behind each of the driver side tires 2, and a passenger side mat 12 in front of or behind each of the passenger side tires 2 corresponding with the driver side mats. The user can then drive the vehicle on top of the tire mats 12 until the tire 2 contacts the tire stop 20.

Some or all embodiment of the present technology can include one or more cover connector members 36 each including a cover connector strap 38 and a cover connector piece 40. The cover connector strap 38 can be fixed to the vehicle cover 44 at a location near the tire 2 of the vehicle when the vehicle cover is placed over the vehicle so that the cover connector piece 40 is capable of engaging with the mat connector piece 30, respectively.

After which, the vehicle cover 44 can be placed over the vehicle. The cover straps 32 can be run over the vehicle and on top of the vehicle cover 44. The length of the mat connector straps 26 and/or the cover connector straps 38 can be adjusted so that the mat connector pieces 30 and the cover connector piece 40 can engage with each other, respectively. The length of the mat connector straps 26 and/or the cover connector straps 38 can then be adjusted to tighten the cover straps 32 and secure the vehicle cover 44 in place.

To remove the vehicle cover 44, the user may just repeat the above installation steps in reverse.

While embodiments of the vehicle cover blow-off prevention system, device and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although securing a vehicle cover utilizing the weight of the vehicle have been described, it should be appreciated that the vehicle cover blow-off prevention system, device and method herein described is also suitable for securing any cover on to an object that is capable of resting on the mat.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A vehicle cover blow-off prevention system comprising:
    tire mats configured to support a tire of a vehicle thereon, each of the tire mats including a mat body, a tire stop at one end of the mat body, and a mat connector member configured to hold a vehicle cover to the vehicle, the mat connector member includes a mat connector strap attached to the mat body and a mat connector piece.

2. The vehicle cover blow-off prevention system according to claim 1, wherein the tire stop includes an elongated member extending across the end of the mat body in a direction lateral with the tire placed on the tire mats, respectively.

3. The vehicle cover blow-off prevention system according to claim 2, wherein the mat body encloses the elongated member.

4. The vehicle cover blow-off prevention system according to claim 1 further comprises a cover strap configured to secure the vehicle cover to the vehicle, the cover strap including a first cover connector member at a first end of the cover strap, and a second cover connector member at a second end of the cover strap, the first cover connector member being configured to engage with the mat connector member of a first of the tire mats, and the second cover connector member being configured to engage with the mat connector member of a second of the tire mats.

5. The vehicle cover blow-off prevention system according to claim 4, wherein the first cover connector member includes a first cover connector strap attached to the first end of the cover strap, and a first cover connector piece engageable with the mat connector piece of the first of the tire mats, and wherein the second cover connector member includes a second cover connector strap attached to the second end of the cover strap, and a second cover connector piece engageable with the mat connector piece of the second of the tire mats.

6. The vehicle cover blow-off prevention system according to claim 5, wherein the mat connector member is a pair of mat connector members, the first cover connector member is a pair of first cover connector members, and the second cover connector member is a pair of second cover connector members.

7. The vehicle cover blow-off prevention system according to claim 5, wherein the cover strap includes an arched section configured to receive a side section of the tire.

8. The vehicle cover blow-off prevention system according to claim 1 further comprises one or more cover connector members each including a cover connector strap and a cover connector piece, the cover connector strap being fixed to the vehicle cover at a location near the tire of the vehicle when the vehicle cover is placed over the vehicle so that the cover connector piece is capable of engaging with the mat connector piece, respectively.

9. A vehicle cover blow-off prevention system comprising:
   tire mats configured to support a tire of a vehicle thereon, each of the tire mats including a mat body, a tire stop at one end of the mat body, and a mat connector member, the mat connector member includes a mat connector strap attached to the mat body and a mat connector piece; and
   a cover strap configured to secure a vehicle cover to the vehicle, the cover strap including a first cover connector member at a first end of the cover strap, and a second cover connector member at a second end of the cover strap, the first cover connector member being configured to engage with the mat connector piece of a first of the tire mats, and the second cover connector member being configured to engage with the mat connector piece of a second of the tire mats.

10. The vehicle cover blow-off prevention system according to claim 9, wherein the tire stop includes an elongated member extending across the end of the mat body in a direction lateral with the tire placed on the tire mats, respectively.

11. The vehicle cover blow-off prevention system according to claim 10, wherein the mat body encloses the elongated member.

12. The vehicle cover blow-off prevention system according to claim 9, wherein the first cover connector member includes a first cover connector strap attached to the first end of the cover strap, and a first cover connector piece engageable with the mat connector piece of the first of the tire mats, and wherein the second cover connector member includes a second cover connector strap attached to the second end of the cover strap, and a second cover connector piece engageable with the mat connector piece of the second of the tire mats.

13. The vehicle cover blow-off prevention system according to claim 12, wherein the mat connector member is a pair of mat connector members, the first cover connector member is a pair of first cover connector members, and the second cover connector member is a pair of second cover connector members.

14. The vehicle cover blow-off prevention system according to claim 12, wherein the cover strap includes an arched section configured to receive a side section of the tire.

15. The vehicle cover blow-off prevention system according to claim 9 further comprises a clamp pivotably attachable to the mat connector piece.

* * * * *